Feb. 4, 1969   N. MALARKEY, JR   3,425,342
PRESS WITH DEFORMABLE CYLINDERS
Filed April 18, 1966

Neil Malarkey, Jr.
INVENTOR
BY
Kolisch & Hartwell
Attys.

Neil Malarkey, Jr.
INVENTOR

BY

Rolisch + Hartwell
Attys.

United States Patent Office 3,425,342
Patented Feb. 4, 1969

3,425,342
PRESS WITH DEFORMABLE CYLINDERS
Neil Malarkey, Jr., Seattle, Wash.
(Rte. 2, Box 2126, Bainbridge Island, Wash. 98110)
Filed Apr. 18, 1966, Ser. No. 543,343
U.S. Cl. 100—151    5 Claims
Int. Cl. B30b 5/06; B27d 3/04

ABSTRACT OF THE DISCLOSURE

A continuous press including a pair of resilient, flexible belts, each movably trained over a pair of spaced pulleys, with the belts having opposed closely-spaced runs defining a path for movement of a workpiece through the press, and with such runs having compressive bending stresses adjacent their outer surfaces and tensive bending stresses adjacent their inner surfaces. The opposing runs are positioned to be deformed by a workpiece on the path, so as to have compressive bending stresses adjacent their outer surfaces which are greater than those which exist prior to such deformation.

---

This invention relates to a belt for press apparatus, such as may be employed in a continuous press to carry work through the press.

Continuous presses are known which employ a pair of continuous belts having opposed runs that press against opposite sides of a workpiece while transporting the workpiece through the apparatus. Typically, the belts are trained over and moved by power-driven pulleys. Such a press is disclosed in my United States Patent No. 3,215,065, issued Nov. 2, 1965. Each belt may be constructed from an elongated flat strip of steel, by joining the ends of the strip together to form the belt. With such construction, even before the belt is trained over the pulleys, it has an initial internal bending stress which causes compression in the belt material adjacent the inner surface of the belt, and tension in the belt material adjacent the outer surface of the belt. When the belts are trained over and driven by pulleys, the expanses of the belts that are bent around the pulleys are subjected to even greater bending stresses which, if the belts are too thick, can stress the belt material beyond its elastic limit and cause permanent damage to the belts. It has thus been necessary in the past to employ relatively thin belts in order to avoid such damage.

The use of thin belts, however, presents certain disadvantages. For one thing, a thin belt has considerable flexibility, and because of this flexibility there is a need to provide extensive support for the back of the belt where it is used to apply pressure to prevent backing off of the belt and relaxation of pressure. A back-up roller only provides line contact with a belt, and between consecutive back-up rollers in a press there is a region where the belt spans the rollers free of support. This indicates the use of relatively small diameter back-up rollers, but reduced roller size introduce a number of complications. Sliding shoes may be utilized to back up a belt, but these introduce lubrication problems. With a thick belt the stiffness imparted to a belt by reason of its being thick may be utilized as a major contributing factor in the production of useful pressure in a press, and many of the above indicated problems are eliminated or at least reduced.

A general object of the invention, therefore, is to provide, for a continuous press, a novel belt which avoids the above indicated difficulties encountered with known belts.

More particularly, an object is to provide a belt which may be made to be substantially thicker than presently known belts, yet which may be trained over pulleys of practicable sizes without experiencing damaging bending stresses.

The belt contemplated herein comprises a deformable cylinder. The belt is substantially completely relaxed (i.e., has no residual bending stresses existing in the material forming the belt) when in the shape of a cylinder. When the belt is trained over pulleys, the expanses of the belt which extend around the pulleys experience a bending stress in one direction, and the runs of the belt extending between the pulleys experience a bending stress in the opposite direction.

Comparing such a belt with a belt of the same thickness constructed in a conventional manner, if the two belts are trained over the same pulleys, maximum bending stresses experienced by the former are considerably smaller than maximum bending stresses experienced by the latter. Thus, and according to the invention, with pulleys of a given size, it is possible to employ belts which are substantially thicker than those which may presently be used, without fear of stressing the belt material beyond its elastic limit.

A further object is to provide a belt of the type described which enables useful press pressure to be maintained on a workpiece traveling through the pressing apparatus, without the introduction of appreciable frictional power loss in the apparatus because of a back-up agency.

These and other objects and advantages attained by the invention will become more fully apparent as the description which follows is read in conjunction with the accompanying drawings, wherein.

Figure 1:
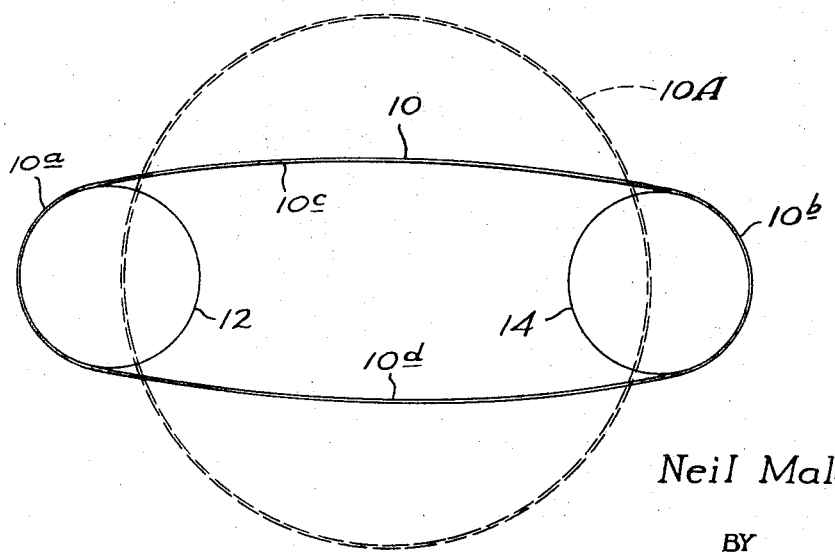
FIG. 1 is a simplified drawing illustrating a belt as contemplated herein with the belt shown in dashed outline as it would appear when relaxed, and in solid outline as it appears when trained over pulleys.

Turning now to the drawings, and with reference first to FIG. 1, at 10 is a continuous belt as contemplated by the present invention. The belt is constructed in the form of a deformable cylinder (indicated in dashed outline 10A) with the belt material, preferably steel, being relaxed and substantially free of any bending stresses with the belt shaped as a cylinder.

As illustrated in solid outline, belt 10 is in a deformed condition. The curvature of the belt where it is trained over a pair of spaced-apart pulleys 12, 14 is increased, and between the pulleys the belt is flattened. Considering the internal stress conditions of the belt as thus deformed, belt expanses 10a, 10b, which curve around the pulleys, experience bending stresses in one direction, and belt runs 10c, 10d, which extend between the pulleys, experience bending stresses which are the reverse of those in expanses 10a, 10b. More particularly, expanses 10a, 10b each experience a compressive bending stress adjacent the inner surface of the belt and a tensive bending stress adjacent the outer surface. Runs 10c, 10d each experience a compressive bending stress adjacent the outer surface of the belt, and a tensive bending stress adjacent the inner surface.

Figure 3:
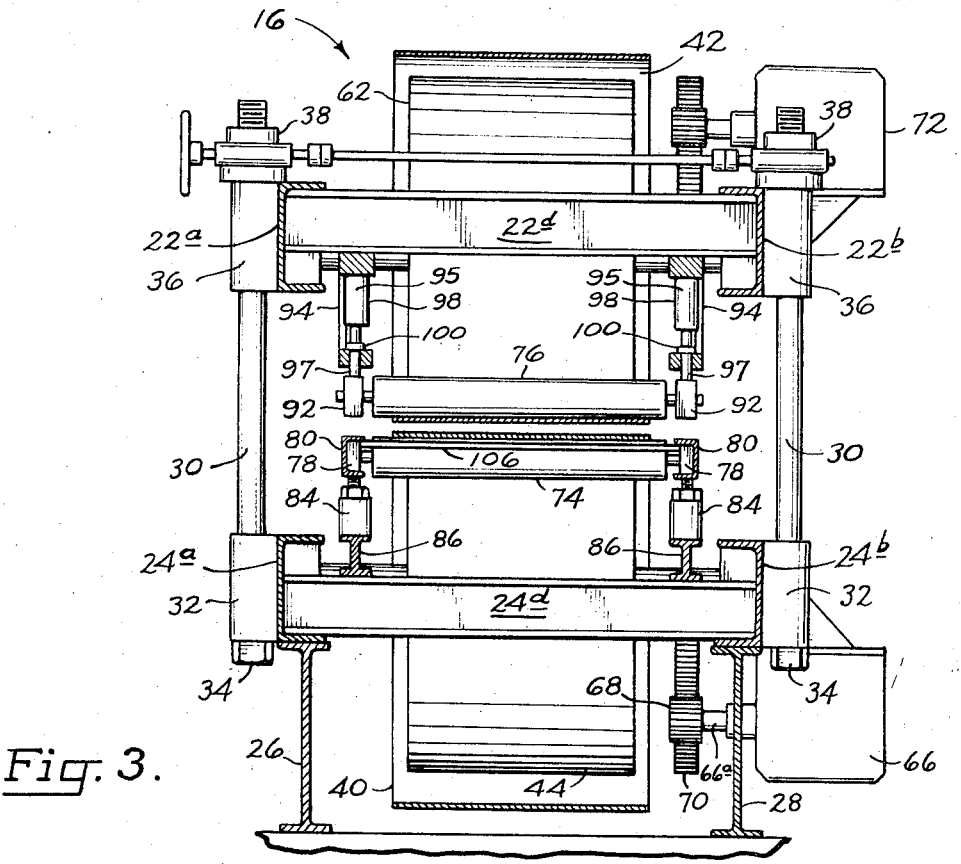
FIG. 3 is a cross-sectional view taken along the line 3—3 in FIG. 1.
Figure 2:
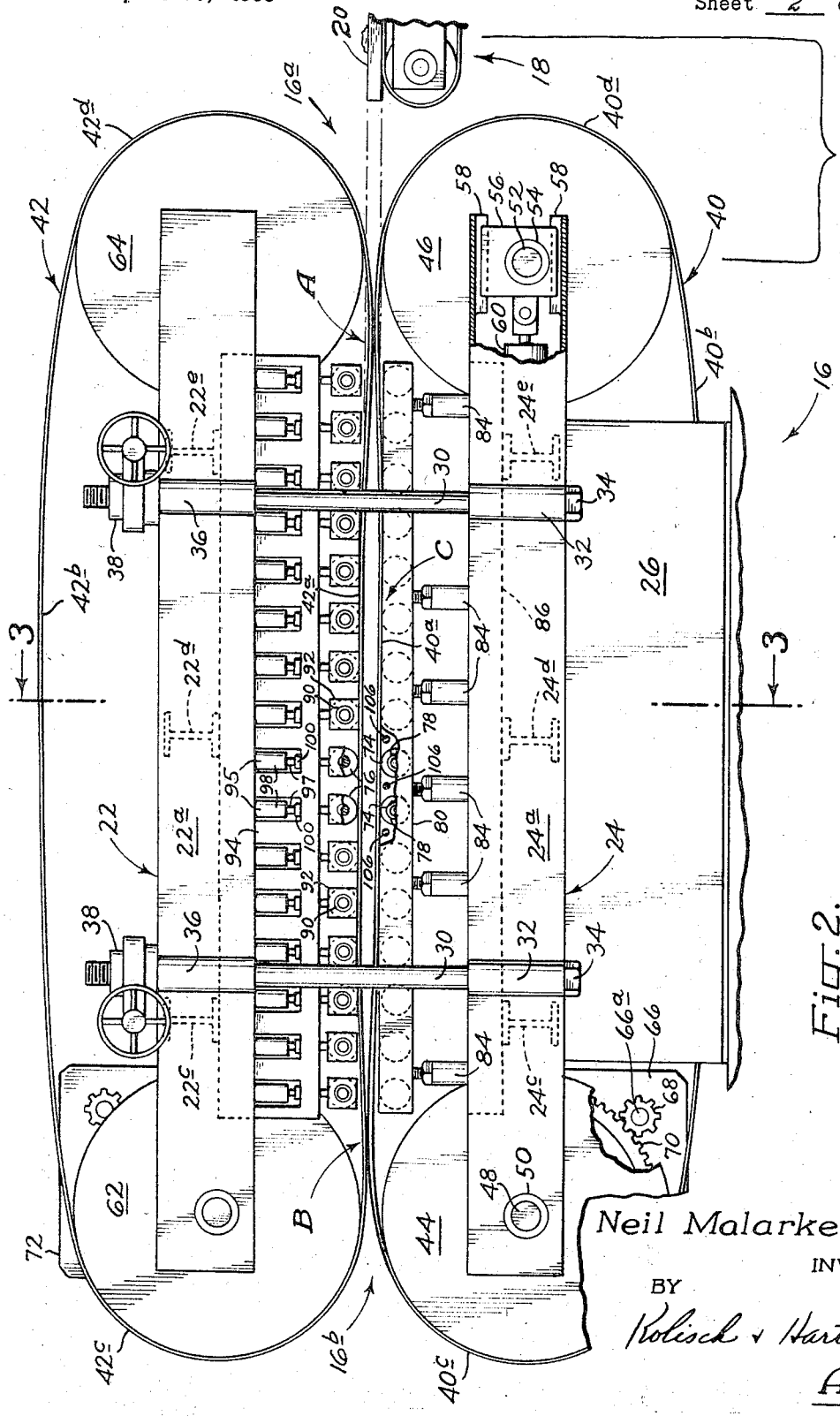
FIG. 2 (second sheet of drawings) is a side elevation of one form of continuous press apparatus which employs a pair of belts similar to the belt shown in FIG. 1.

Referring to FIGS. 2 and 3, press apparatus is illustrated generally at 16, having an infeed end 16a and an off bearing end 16b. For purposes of illustration, the particular form of apparatus shown is of the type that might be used in the patching of wood veneer. Thus, disposed in front of the apparatus, closely adjacent infeed end 16a, is feed conveyor 18 which feeds workpieces, such as piece 20 of patched wood veneer, into the pressing apparatus.

Considering apparatus 16 now in more detail, it includes upper and lower frame sections 22, 24. The upper frame section comprises a pair of laterally spaced longitudinal channel members 22a, 22b, which extend from the infeed to the off bearing ends of the apparatus. Transverse beams 22c, 22d, 22e extend between and are suitably welded to the channel members at points distributed along the lengths of the latter. The lower frame section is similar to the upper frame section, with channel members 24a, 24b corresponding to channel members 22a, 22b, and beams 24c, 24d, 24e corresponding to beams 22c, 22d, 22e.

The lower frame section is supported above the floor by beams 26, 28 which are welded to channel members 24a, 24b, respectively. The upper frame section is supported above the lower frame section by means of elongated upright posts such as the ones shown at 30.

The lower ends of posts 30 are received in suitable collars 32 which are secured as by welding to the sides of channel members 24a, 24b. The posts are held in place by means of nuts 34 which are screwed onto lower threaded ends of the posts and are suitably fastened to the bottoms of the collars by fasteners (not shown). The upper ends of the posts are received in collars 36 which are welded to the sides of channel members 22a, 22b.

Adjacent their upper ends, the posts are appropriately engaged by jacks 38 which are fastened to the tops of collars 36. The two jacks adjacent each end of the apparatus may be suitably connected together for simultaneous operation as by the rod shown in FIG. 3 which interconnects the pair of jacks there illustrated. These jacks may be operated to adjust the elevation of upper frame section 22 relative to lower frame section 24.

The press apparatus further includes a pair of movable continuous belts 40, 42. These are constructed as described in connection with belt 10.

Considering the mounting for lower belt 40, the belt is trained over a pair of pulleys 44, 46, referred to herein as a training means, which are located adjacent the off bearing and infeed ends, respectively, of the press. Pulley 44 is joined to an elongated horizontal shaft 48 whose ends are journaled in bearings such as bearing 50 which are suitably mounted in channel members 24a, 24b of the lower frame section. Pulley 46 is joined to an elongated horizontal shaft 52. This shaft has its ends journaled in bearings 54 which are suitably mounted in carriages such as carriage 56, these carriages being slidably supported in pairs of guides 58 that are welded to channel members 24a, 24b.

The carriages are adapted to slide longitudinally in the guides for the purpose of shifting pulley 46 closer to or farther away from pulley 44, thus to change the amount of deformation in belt 40. Means is provided for shifting the carriages comprising a pair of fluid-operated rams such as the one shown at 60 which have their cylinder portions suitably fastened to the inside surfaces of channel members 24a, 24b, and their extensible rod portions suitably connected to the carriages.

The mounting for belt 42 is similar to that for belt 40, with the belt being trained over pulleys 62, 64 which correspond to pulleys 44, 46. Pulleys 62, 64 are mounted on channel members 22a, 22b of the upper frame section similarly to the mounting of pulleys 44, 46 on channel members 24a, 24b.

With the belts trained over the pulleys in the manner illustrated, each belt has a pair of elongated runs (shown at 40a, 40b and 42a, 42b) which extend between the pulleys, and a pair of expanses (shown at 40c, 40d and 42c, 42d) which curve around the pulleys. Belt runs 40a, 42a are disposed directly opposite one another, and extend along substantially the center of the press apparatus. Here they define what is referred to herein as a pressure-applying channel or zone.

Means for driving pulleys 44, 46 and belt 40 comprises an electric motor 66 which is suitably mounted on channel member 24b adjacent the off bearing end of the apparatus. This motor has a drive shaft 66a on which is fastened a pinion gear 68. The teeth of pinion gear 68 mesh with teeth on a gear 70 which is joined to and rotates shaft 48.

A motor 72 corresponding to motor 66 is mounted on channel member 22b. Motor 72 is adapted to drive pulleys 62, 64 and belt 42.

The press apparatus further includes back-up support rollers for the belt runs 40a, 42a. Thus, an upper set of elongated transversely extending rollers which are distributed along the length of the belt run 42a are shown at 76, and a similar lower set of transverse back-up rollers for run 40a are shown at 74.

Considering the mounting for rollers 74, each has its ends journaled in bearings, such as bearings 78. The bearings are suitably mounted in elongated beams 80, which beams are supported on top of vertically adjustable post assemblies 84. These post assemblies in turn are supported on elongated I-beams 86 which are mounted on top of transverse beams 24c, 24d, 24e.

Rollers 76 have their ends journaled in bearings 90, each of which is suitably mounted in a bearing housing 92. Located above the bearing housings and part of the frame of the apparatus are elongated beams 94 which are secured as by welding to the bottoms of transverse beams 22c, 22d, 22e. These beams are recessed to receive cylinders 95 of fluid-operated rams 98, with the cylinders suitably secured to the beams. Extensible rods 97 of the rams extend down through appropriate bores in the bottom flanges of the beams to connections with the bearing housings. Nuts 100 are screwed onto threaded portions of the rods and function to limit the downward extension of these rods by striking the bottom flanges of the beams. With fluid under pressure admitted to the rams to produce extension, rollers 76 are forced downwardly and at the same time force upper run 42a downwardly toward run 40a.

The press apparatus illustrated also includes means for heating a workpiece as it travels through the apparatus. The heater means shown comprises electrically operated heater elements such as the ones shown at 106. The heater elements extend transversely across the belt runs and are located between adjacent rollers 74.

Due to the construction described for belts 40, 42, runs 40a, 40b, 42a, 42b of the belts have bending stresses therein which are compressive adjacent the outer surfaces of these runs and tensive adjacent the inner surfaces. Expanses 40c, 40d, 42c, 42d of the belts have bending stresses therein which are the reverse of those described for the runs, i.e. the stresses are compressive adjacent the inner surfaces of the expanses and tensive adjacent the outer surfaces.

In FIG. 2 the press is illustrated devoid of any workpiece passing through the press. With the press set up as illustrated in FIG. 2, and because of the stressed condition of the belts, the belt runs bear against each other in regions of tight contact adjacent opposite ends of the press, such regions being shown at A and B. Between these regions the belt runs are reversely bowed in a pattern that somewhat resembles the pattern of the tread of an inflated tire when such tread is viewed in cross section. Such region is illustrated in FIG. 2 at C, and it will be noted that in this region the belt runs are spaced apart from each other slightly. When a workpiece is passed through the press upon the same traveling into the region of belt contact indicated at A, the workpiece is subjected to relatively high pressure exerted on the faces of the workpieces as a result of the stressed condition of the belt runs. This region where relatively high pressure is exerted, it will be noted, is located somewhat on the feed end of the press from the first of rollers 74, 76. On further travel through the press in the region generally illustrated at C, the pressure applied to the faces of the workpiece is more a function of the relative spacing of rolls 74, 76. Thus, with the rolls spaced relatively close together a greater pressure is exerted in this region than when the rolls are spaced farther apart. In this region of the press the thick character of the belts is important in inhibiting belt flexure in zones located between adjacent rollers so that a less undulating and more constant pressure is applied to the faces of the workpiece. This is possible with relatively large sized back-up rollers spaced some distance apart.

In some applications, for instance in processing workpieces which are extremely thick, with the press empty the belt runs would not come into contact with each other at exactly the same locations shown for the press in FIG. 2. However, with the workpiece passing through the press the belt runs become deformed in a manner producing a high pressure region located toward the feed end of the press from the rollers as a result of the flexed condition of the belts. In yet other applications the rollers might be completely eliminated and the pressures developed in the press would be a function entirely of the stressed condition of the belts.

It will be noted that because the belts of the invention are prepared initially as deformable cylinders, it is possible to train and move relatively thick belts over pulleys of practical size without stressing of the material making up the belts beyond the elastic limit of this material. For example, following the invention, steel belts having a thickness of as much as a quarter inch or so may be successfully used in a press of the type illustrated, which thickness is considerably greater than the thickness of conventional belts which rarely exceeds about 0.1 inch.

It is appreciated that variations and modifications may be made in the invention without departing from the spirit thereof.

It is claimed and desired to secure by Letters Patent:

1. Press apparatus comprising
   means defining a path for the movement of a workpiece through the apparatus,
   a pair of spaced-apart pulleys located adjacent said path at locations spaced along the length thereof,
   a continuous flexible and resilient belt which, in a relaxed state, has the shape of a cylinder that is substantially stress free,
   said belt being movably trained over said pulleys and deformed by such training into a generally ovate course, such deformation producing a compressive bending stress adjacent the outer surface of a run of the belt which extends between the pulleys,
   said run extending along a side of said path in a position to be deformed by a workpiece on said path so as to have a compressive bending stress adjacent its outer surface which is greater than the bending stress produced by reason of the belt being trained over said pulleys.

2. The apparatus of claim 1, wherein the means defining a path for movement of a workpiece through the press comprises a run of another belt.

3. The apparatus of claim 2, wherein said other belt is trained over a pair of spaced-apart pulleys, and stressed by being so trained to have a compressive bending stress adjacent the outer surface of its said run, and wherein said run of said other belt is positioned relative to said run of said first-mentioned belt so as to be deformed by a workpiece on said path to have a compressive bending stress adjacent its said outer surface which is greater than the bending stress produced by reason of said second-mentioned belt being trained over said second-mentioned pulleys.

4. The apparatus of claim 1 which further comprises support means for supporting the inner surface of said run at points distributed along the length thereof.

5. The apparatus of claim 4, wherein said support means comprises rollers which roll against the inner surface of said run.

References Cited

UNITED STATES PATENTS

| | | | |
|---|---|---|---|
| 1,555,840 | 10/1925 | Hanley | 74—231 |
| 2,137,506 | 11/1938 | Osgood | 144—281 |
| 2,526,324 | 10/1950 | Bloomfield | 74—237 X |
| 3,111,149 | 11/1963 | Schubert | 100—154 X |
| 3,208,297 | 9/1965 | Woods et al. | 74—231 |
| 3,215,065 | 11/1965 | Malarkey | 100—152 X |

WALTER A. SHEEL, *Primary Examiner.*

U.S. Cl. X.R.

144—281